July 21, 1959  B. RIDGEWAY  2,895,771
EXPANSION WHEEL HUB BEARING
Filed Dec. 16, 1957
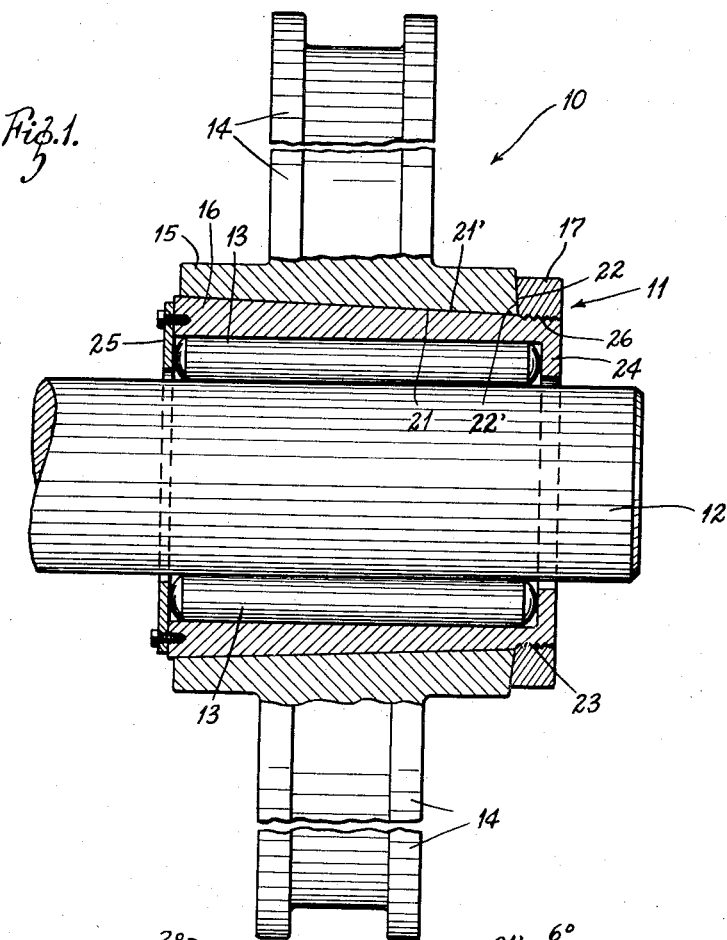
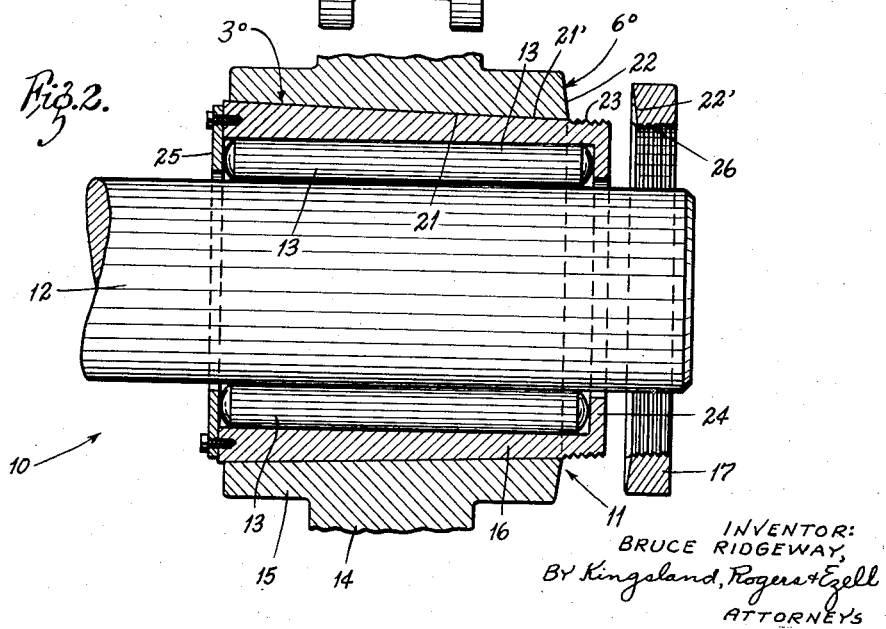
INVENTOR:
BRUCE RIDGEWAY,
BY Kingsland, Rogers & Ezell
ATTORNEYS

United States Patent Office 2,895,771
Patented July 21, 1959

2,895,771

EXPANSION WHEEL HUB BEARING

Bruce Ridgeway, Mexico, Mo.

Application December 16, 1957, Serial No. 703,009

3 Claims. (Cl. 308—236)

This invention relates to improvements in wheel hub bearings, and in particular is concerned with an expansion wheel hub bearing which provides for expansion of the bearing on subjection of the wheel to high temperatures, as in refractory kilns and the like.

In the past, kiln cars which carry loads of refractory materials, such as green bricks and the like, into refractory kilns have been subjected to a great deal of wear and strain due to the rapid temperature changes when the cars are transferred from ambient atmospheric temperatures to the high temperatures experienced in the refractory kiln. In traveling through the tunnel kilns and the like in a refractory, temperatures often are encountered in the neighborhood of 1000° F. Actually, the kiln temperatures may be as high as 2500° F. and higher, but there is generally a shield which reduces the temperature to which the kiln cars are exposed. However, such temperatures to which the kiln cars are exposed can be anywhere from 400 to 500° F. up to 1000° F.

This high temperature change has caused wheel hub bearings to lock or freeze because of the expansion of the metal from which they are constructed. Such bearings are quite often made in the form of flat sleeves, and a so-called "mushrooming" effect and locking can take place upon the subjection of the bearings to the very high temperatures involved. The expansion and subsequent contraction when the cars are taken into the kiln and then returned to the outside atmosphere have represented a very serious problem in the life of kiln car wheels and bearings. Because of this severe wear and stress on the bearings, repair and maintenance are required at frequent intervals.

Through this invention, there has been provided a wheel hub bearing which utilizes a tapered sleeve and a tapered draw ring which cooperates with the sleeve and the wheel hub to permit free expansion and contraction on subjection of the kiln car wheels to alternate high temperatures and removal to atmospheric temperature. Conventional cylindrical roller bearings may be used and the entire device is of a simplified nature which makes it very adaptable to existing kiln car wheels.

Basically, the expansion wheel hub bearing of this invention provides for an expansion sleeve, the inner surface of which is cylindrical and cooperates with roller bearings fitting between it and the axle of the kiln car. The exterior surface of the sleeve is tapered and cooperates with a mating tapering surface of the wheel. A draw ring is further provided which is engageable with the sleeve. This draw ring has a tapered surface cooperating with a tapering surface of the wheel and provides for a component of force which upon high temperature facilitates the expansion and free movement of the sleeve along the taper of the wheel to prevent binding or locking of the roller bearing. The draw ring further serves to return the sleeve to the original position upon cooling and thereby keeps the bearing from becoming too loose.

Thus, there has been provided by this invention a simple expansion sleeve and draw ring device which can be used with existing car wheels or embodied in new wheels. Maintenance is greatly simplified and wear and the life of the wheel are greatly increased at a minimum of expense.

Accordingly, it is a primary object of this invention to provide an expansion wheel hub bearing for wheels which undergo high temperature changes with subsequent reduction in temperature without locking of the bearing.

A further object of this invention is to provide an expansion wheel hub bearing employing a tapered sleeve which cooperates with a tapered surface of the wheel to permit expansion and contraction when the wheel is subjected to alternate high and low temperatures to prevent locking of the bearings.

Still a further object of this invention is to provide an expansion wheel hub bearing employing a tapered sleeve and a tapered draw ring in which these elements are capable of movement with respect to the wheel to prevent locking of bearings.

Still a further object of this invention is to provide an expansion wheel hub bearing in which a tapered sleeve fits within a tapered opening in a wheel in mating relationship and cooperates with a sleeve draw ring which fits in tapered relation to the wheel in a cooperating fashion whereby bearings may be placed on the interior of the sleeve around an axle to prevent locking of the bearings on alternate environments of high temperature and low temperature.

Still a further object of this invention is to provide an expansion wheel hub bearing employing a tapered sleeve and a tapered draw ring which are simple in construction with rugged characteristics.

Further objects of this invention will be apparent in the detailed description which follows and will be further apparent to those skilled in the art.

For the purpose of illustration of this invention, there is shown in the accompanying drawings a preferred embodiment. It is to be understood that these drawings, however, are for the purpose of illustration only and that the invention is not limited thereto and can be employed in applications other than in kiln car wheels.

In the drawings:

Figure 1 is a view partly in section through the expansion wheel hub bearing of this invention, but showing the roller bearings and axle and the rim of the wheel in full lines; and Figure 2 is a view similar to Figure 1, but showing the sleeve draw ring in exploded form and disengaged from the sleeve.

In Figures 1 and 2, a wheel 10 is shown provided with an expansion wheel hub bearing 11. The wheel is supported on an axle 12 and a plurality of roller bearings 13 are provided. The wheel itself has a rim 14 and a hub 15 upon which are supported the expansion sleeve 16 and the sleeve draw ring 17.

In the particular construction of the hub, it will be noted that there is an interior tapered surface 21 mating with a sleeve surface 21' and an end tapered surface 22 mating with a draw ring surface 22'. For purposes of illustration, the interior tapered surface 21 is at an angle of 3° to the horizontal which is a preferred angular disposition, but it should be understood that this angle can vary from a smaller degree to as much as 15° in normal circumstances, or even as high as 30 to 45° under extreme situations. The end surface 22 is tapered at an angle of 6° to provide for greater expansion in the drawing form of the draw ring, as will further appear. This angular disposition of the surface 22 is a preferred angular disposition, but here again it should be understood that this angularity can be either less or of a greater degree, such as 15° and upwards as in the case of the tapered surface 21.

The expansion sleeve 16 has a threaded surface 23 at one end and a flange 24 to confine the roller bearings 13. At its other end, it has a retaining ring 25.

The draw ring tapering surface 22' cooperates with the surface 22 of the hub in much the same manner as the expansion sleeve surface 21' cooperates with the interior surface 21 of the hub. The draw ring is further threaded at its interior surface 26 so that it may be threadedly engaged with the sleeve.

Use

In actual use, it is evident that the draw ring 17 may be very simply secured to the end of the expansion ring 16 by merely screwing it onto the threaded end of the ring. In similar fashion, the draw ring may be unscrewed and withdrawn as shown in Figure 2. In such condition, as shown in Figure 2, the expansion sleeve may be very simply withdrawn by moving it to the left as shown in this figure. Further, should for any reason the elements be frozen together due to inclusion of foreign matter or breakdown of the roller bearings, etc., the exposed end may be tapped and driven out to the left.

In describing the operation of the components of the expansion wheel hub bearing, it will be presumed first of all that the wheel which may be placed on a kiln car or the like is taken from ambient atmospheric conditions into a tunnel kiln where it is subjected to extremely high temperatures in the range of 500 to 1000° F. Under such conditions, the components will very rapidly heat up and the axle roller bearing, expansion sleeve as well as the hub all tend to expand. Because of the relative thinness of the sleeve, it may expand fairly freely in a vertical direction against the tapered surface 21 of the hub due to the stress of the roller bearings and the axle.

As viewed in Figure 1, this expansion will be upward at the top of the expansion sleeve against the interior surface 21, and also below the axle there will be a similar expansion downward against the corresponding surface 21 of the wheel hub. Due to the slanting nature of the tapering surfaces, the resultant component will be to the left and the expansion sleeve will tend to move slightly in this direction, and as it so moves will present a larger area for the expansion of the roller bearing and axle within the confines of the sleeve and the hub. It will also be understood that the interior tapering surface 21 of the hub will also expand slightly, since the interior volume of a hollow object under such conditions does so expand. However, this expansion is not quite so rapid due to the greater mass of the hub. Thus, it will be readily understood that the expansion forces which come into play upon the subjection of the wheel to the very great temperatures will not cause locking of the bearings.

Under the conditions as outlined above, there is a simultaneous expansion of the draw ring 17. As it expands, it will tend to ride up the tapering surface 22 at the end of the hub. At the initial exposure to the high temperature conditions, it will be understood that there will be a more rapid expansion of the draw ring and the hub since it is more exposed to the high temperature environment than is the interior of the hub. As the expansion sleeve draw ring 17 moves slightly up the incline, there is a component of force directing it to the left which frees the expansion ring 16 to a slight extent so that it can similarly move to the left. This amount of movement is relatively small but the expansion of the draw ring because of the threaded engagement with the end of the sleeve also actually causes a movement of the sleeve in the direction described and prevents any binding of the roller bearings within the hub. This movement of the draw ring, therefore, provides a double-fold action in retaining the sleeve and also facilitating the partial withdrawal of the sleeve in the left hand direction to provide for internal expansion of the roller bearing and the axle within the interior of the sleeve.

Upon the return of the kiln car to the outside atmosphere from the interior of the tunnel kiln or other region of high temperature, a reverse situation to that above described occurs. Thus the draw ring 17 tends to contract first since it is of small mass in the hub and in a manner rides down the tapered surface 22 of the end of the hub. As it rides down, it moves slightly to the right and tends to withdraw the sleeve 16 to the right, as viewed in the drawings. Thus, as the wheel cools, the hub and the sleeve tend to return to their original condition and the sleeve is drawn to the right to its original condition. Through the combined action of the draw ring which returns the sleeve by its movement forcing the sleeve to the right, together with the internal contraction of the hub and the sleeve, the original close fitting relationship is again realized and the roller bearing and the axle have the same relationship with the expansion wheel hub bearing as at the beginning of the cycle.

The expansion wheel hub bearing of this invention has worked very well under conditions of long service and very high temperature variations. The construction is simple in nature and can be very simply employed in existing wheels by merely boring out the hub and emplacing the sleeve and draw ring in the relationship shown. The service life of a wheel is greatly improved by the embodiment of this invention, which is a great advantage when it is realized that conventional kiln car wheel bearings have a very short operational life.

Various changes and modifications may be made in this invention as will be apparent to those skilled in the art. Such changes and modifications and variations in the degree of the components employed are within the scope and teaching of this invention as defined by the claims appended hereto.

What is claimed is:

1. An expansion bearing for a wheel subjected to high temperature variations, said bearing comprising a sleeve having an interior bearing surface and a tapered exterior surface, said tapered exterior surface being mated with an interior tapering surface provided on a hub of said wheel, and draw means cooperating with the hub and the sleeve urging the sleeve in an expanded direction upon increases in temperature of the wheel and urging the sleeve in a contracted direction upon reductions in temperature of the wheel, said draw means comprising a draw ring secured to the reduced end of the sleeve, said draw ring having a tapered surface cooperating with a tapered surface at the end of the wheel hub.

2. An expansion bearing for a wheel subjected to high temperature variations, said bearing comprising a sleeve having an interior bearing surface and a tapered exterior surface, said tapered exterior surface being mated with an interior tapering surface provided on a hub of said wheel, and draw means cooperating with the hub and upon increases in temperature of the wheel and urging the sleeve in a contracted direction upon reductions in temperature of the wheel, said draw means comprising a draw ring secured to the reduced end of the sleeve, said draw ring having a tapered surface cooperating with a tapered surface at the end of the wheel hub, said draw ring tapered surface tapering from the rim of the ring inwardly to the interior of said ring.

3. An expansion bearing for a wheel subjected to high temperature variations, said bearing comprising a sleeve having an interior bearing surface and a tapered exterior surface, said tapered exterior surface being mated with an interior tapering surface provided on a hub of said wheel, and draw means cooperating with the hub and the sleeve urging the sleeve in an expanded direction upon increases in temperature of the wheel and urging the sleeve in a contracted direction upon reductions in temperature of the wheel, said draw means comprising a draw ring secured to the reduced end of the sleeve, said draw ring having a tapered surface cooperating with a tapered surface at the end of the wheel hub, said draw ring tapered surface tapering from the rim of the ring inwardly to the interior of said ring, said draw ring being threadedly secured to the sleeve and removable therefrom, and said sleeve being removable from the hub upon removal of the draw ring by moving it in a direction toward its enlarged end.

References Cited in the file of this patent

UNITED STATES PATENTS

| | | |
|---|---|---|
| 940,106 | Wulff | Nov. 16, 1909 |
| 1,985,434 | Vancil et al. | Dec. 25, 1934 |